(12) United States Patent
Thiebaut et al.

(10) Patent No.: US 8,782,255 B2
(45) Date of Patent: Jul. 15, 2014

(54) HANDLING OF USER ACCESS-DEPENDENT INFORMATION IN A CORE NETWORK SUBSYSTEM

(75) Inventors: Laurent Thiebaut, Antony (FR); Alain Bultinck, Longpont sur Orge (FR)

(73) Assignee: Alcatel Lucent, Paris (FR)

( * ) Notice: Subject to any disclaimer, the term of this patent is extended or adjusted under 35 U.S.C. 154(b) by 403 days.

(21) Appl. No.: 11/408,048

(22) Filed: Apr. 21, 2006

(65) Prior Publication Data
US 2006/0271693 A1 Nov. 30, 2006

(30) Foreign Application Priority Data
Apr. 22, 2005 (EP) .................................... 05290906

(51) Int. Cl.
*G06F 15/16* (2006.01)
*H04J 3/24* (2006.01)

(52) U.S. Cl.
USPC ............ 709/228; 709/227; 709/229; 370/349

(58) Field of Classification Search
USPC .......... 709/227–229; 370/349, 254, 352, 469; 455/412.2, 414.1
See application file for complete search history.

(56) References Cited

U.S. PATENT DOCUMENTS

| | | | |
|---|---|---|---|
| 6,854,014 B1 * | 2/2005 | Amin et al. ................... | 709/227 |
| 6,888,821 B2 * | 5/2005 | Rasanen et al. ............... | 370/352 |
| 7,372,840 B2 * | 5/2008 | Le et al. ........................ | 370/338 |
| 7,451,476 B1 * | 11/2008 | Banks et al. ...................... | 726/1 |
| 7,505,482 B2 * | 3/2009 | Adamczyk et al. ........... | 370/469 |
| 7,529,354 B2 * | 5/2009 | Kiss et al. .................. | 379/93.01 |
| 7,876,743 B2 * | 1/2011 | Garcia-Martin et al. ..... | 370/352 |
| 2002/0131395 A1 * | 9/2002 | Wang ............................ | 370/349 |
| 2002/0191556 A1 * | 12/2002 | Krishnarajah et al. ........ | 370/329 |
| 2004/0146036 A1 * | 7/2004 | Parantainen et al. ......... | 370/341 |
| 2005/0111382 A1 * | 5/2005 | Le et al. ........................ | 370/254 |

OTHER PUBLICATIONS

Patel, G.; Dennett, S.;"The 3GPP and 3GPP2 movements toward an all-IP mobile network", Personal Communications, IEEE vol. 7 , Issue: Apr. 2000 , pp. 62-64. [retrieved from IEEE databse on Jul. 16, 2010].*

Faccin, S.M.; Lalwaney, P.; Patil, B., "IP multimedia services: analysis of mobile IP and SIP interactions in 3G networks", Communications Magazine, IEEE vol. 42 , Issue: 1; 2004 , pp. 113-120 [retrieved from IEEE database on Sep. 27, 2012].*

Towle (IMS in Next Generation Networks, Apr. 14, 2005).*

(Continued)

*Primary Examiner* — Saleh Najjar
*Assistant Examiner* — Oleg Korsak
(74) *Attorney, Agent, or Firm* — Harness, Dickey & Pierce, P.L.C.

(57) ABSTRACT

An object of the present invention is a method for the handling of user access-dependent information in a system comprising a core network subsystem accessed by an access network, said method comprising:
  a step wherein an entity of said core network subsystem obtains user access-dependent information from said access network,
  a step wherein an entity of said core network subsystem signals to another entity, in the context of a core network subsystem procedure relating to a user's terminal, user access-dependent information obtained from said access network,
  a step wherein an entity of said core network subsystem uses user access-dependent information obtained from said access network, for control of service delivery to said user.

21 Claims, 3 Drawing Sheets

(56) References Cited

OTHER PUBLICATIONS

3GPP SA2: "Excerpt from: Digital cellular telecommunications system (Phase 2+); Universal Mobile Telecommunications System (UMTS); Functional stage 2 description of Location Services (LCS) (3GPP TS 23.271 version 6.11.0 Release 6)" 3GPP Standards, vol. 3-SA2, Mar. 2005, XP002339898.

3GPP SA2: "Excerpt from: Digital cellular telecommunications system (Phase 2+); Universal Mobile Telecommunications System (UMTS); General Packet Radio Service (GPRS); Service description; Stage 2 (3GPP TS23.060 version 6.8.0 Release 6)" 3GPP Standards, vol. 3-SA2, Mar. 2005, XP002339897.

Vodafone: "Tdoc S2-050587: Correction to charging information for MBMS, CR0145" 3GPP Meeting Contribution, Apr. 4, 2005, pp. 1-8, XP002339899.

3GPP CN1: "Excerpt from: Digital cellular telecommunications system (Phase 2+); UMTS; Internet Protocol (IP) multimedia call control protocol based on Session Description Protocol (SDP); Stage 3 (3GPP TS 24.299 version 5.12.0 Release 5)" 3GPP Standards, vol. 3-CN1, Mar. 2005, XP002339900.

3GPP SA2: "3$^{rd}$ Generation Partnership Project; Technical Specification Group Services and System Aspects; IP Multimedia Subsystem (IMS); Stage 2 (Release 6); 3GPP TS 23.228" ESTI Standards, European Telecommunications Standards Institute, Sophia-Antipo, FR, vol. 3-SA, No. V641, Jan. 2004, XP014021933.

3GPP SA2: "Excerpt from: Digital Cellular Telecommunication System (Phase 2+); Universal Mobile System (UMTS); Functional stage 2 description of Location Services (LCS) (3GPP TS 23.271 version 6.11.0 Release 6)" 3GPP Standards, vol. 3-SA2, Mar. 2005, XP002339898.

3GPP SA2: "Excerpt from: Digital Cellular Telecommunications system (Phase 2+); Universal Mobile Telecommunications System (UMTS); General Packet Radio Service (GPRS); Service description; Stage 2 (3GPP TS 23.060 version 6.8.0 Release 6)" 3GPP Standards, vol. 3-SA2, Mar. 2005, XP002339897.

Vodafone: "Tdoc S2-050587: Correction to charging information for MBMS, CR0145" 3GPP Meeting Contribution, Apr. 2005, pp. 1-8, XP002339899.

3GPP CN1: "Excerpt from: Digital cellular telecommunications system (Phase 2+); UMTS; Internet Protocol (IP) multimedia call control protocol based on Session Initiation Protocol (SIP) and Session Description Protocol (SDP; Stage 3 (3GPP TS 2. 229 version 5.12.0 Release 5)" 3GPP Standards, vol. 3-CN1, Mar. 2005, XP002339900.

3GPP SA2: "3$^{rd}$ Generation Partnership Project; Technical Specification Group Services and System Aspects; IP Multimedia Subsystem (IMS); Stage 2 (Release 6); 3GPP TS23.228" ESTI Standards, European Telecommunications Standards Institute, Sophia-Antip, FR, vol. 3-SA, No. V641, Jan. 2004, XP014021933.

* cited by examiner

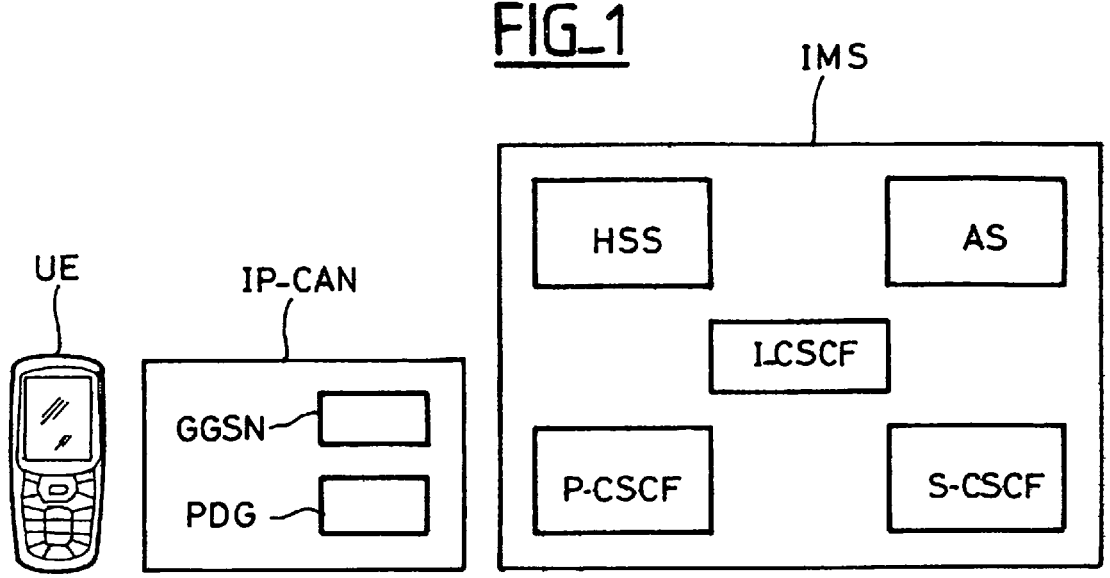
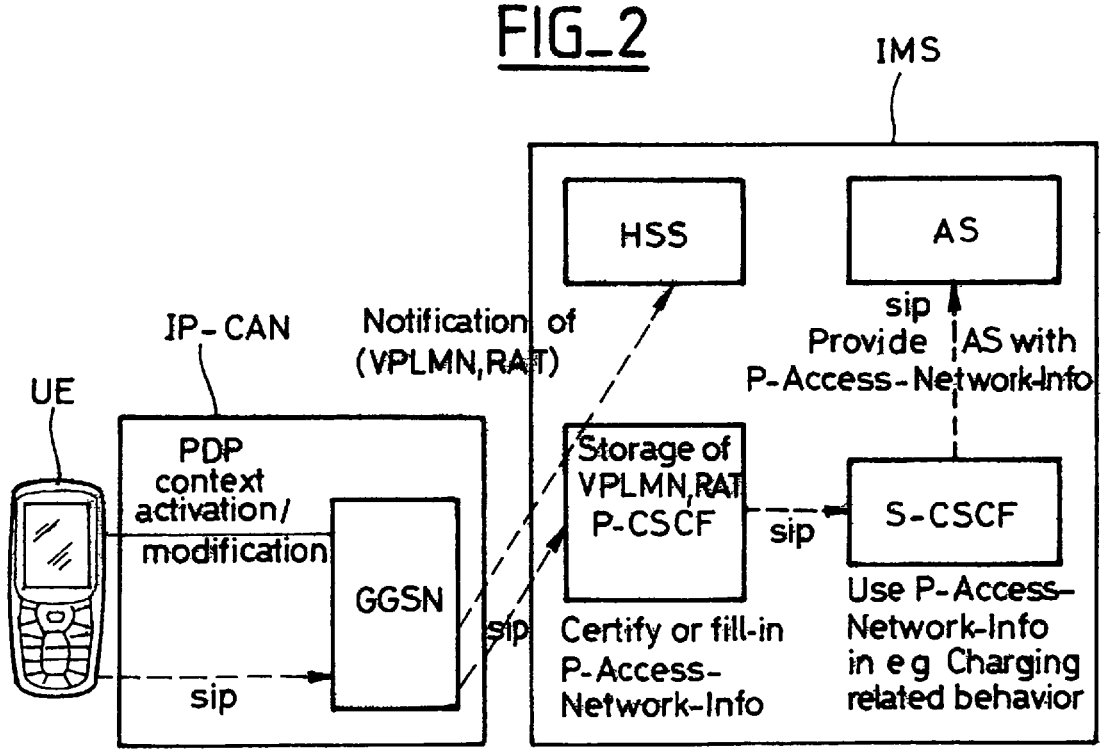

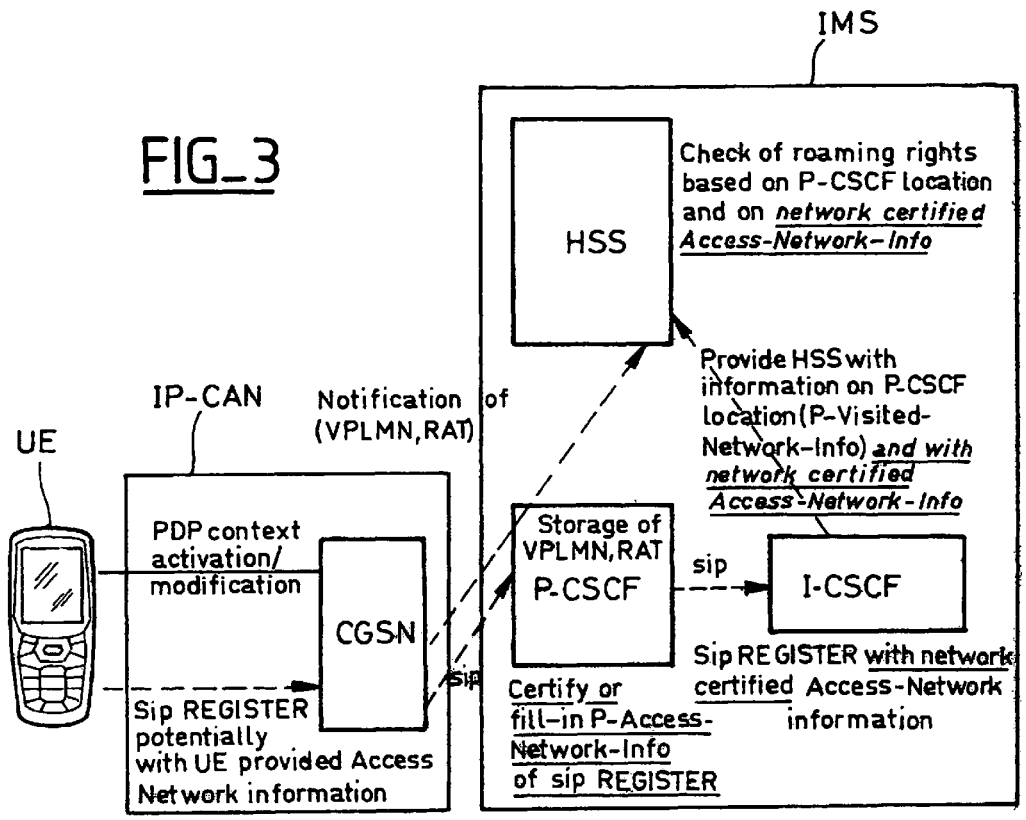
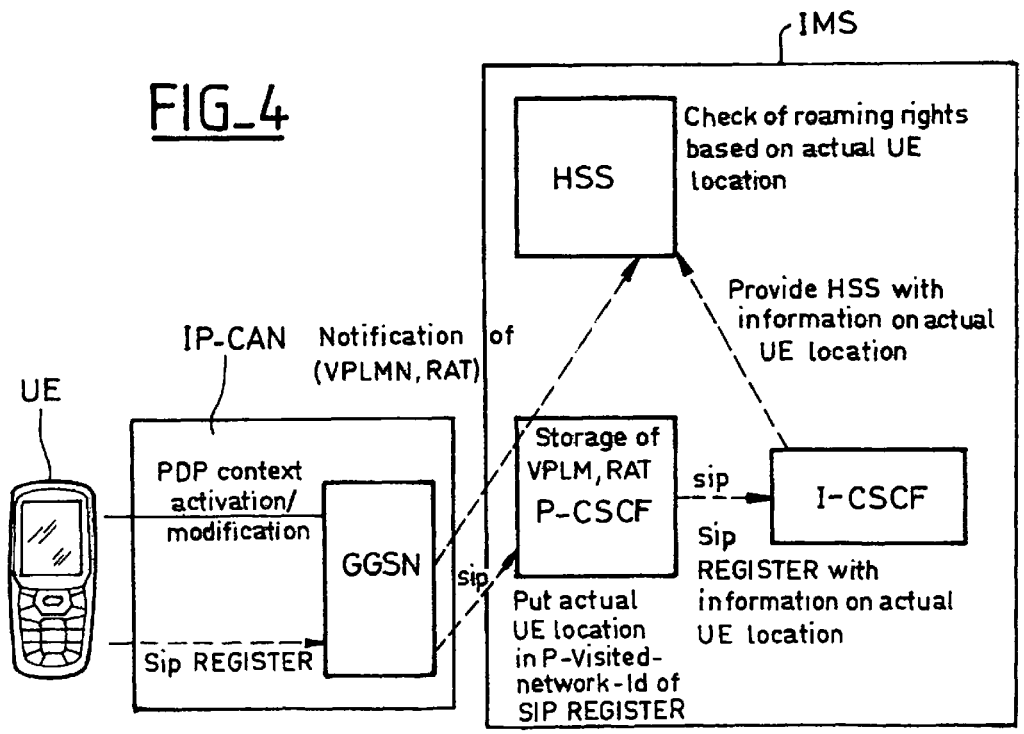

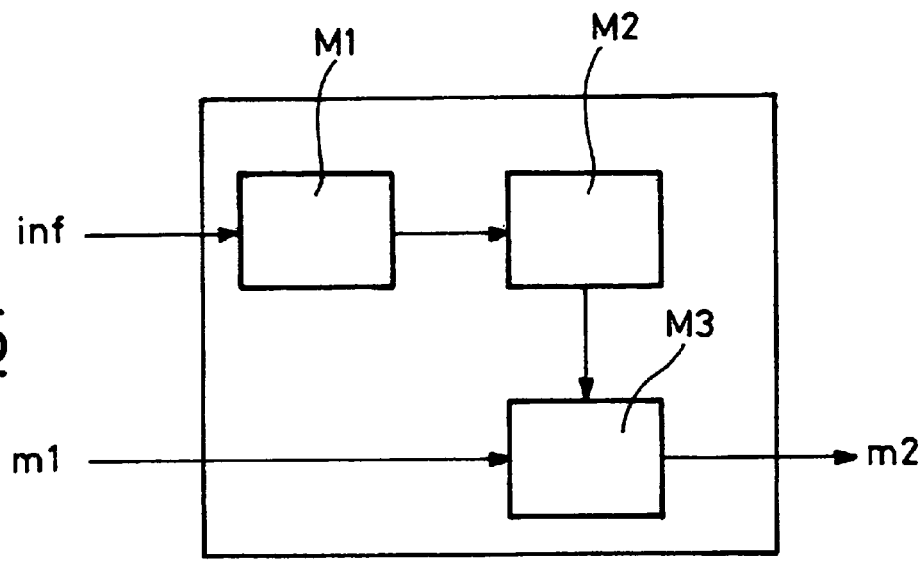
FIG_5
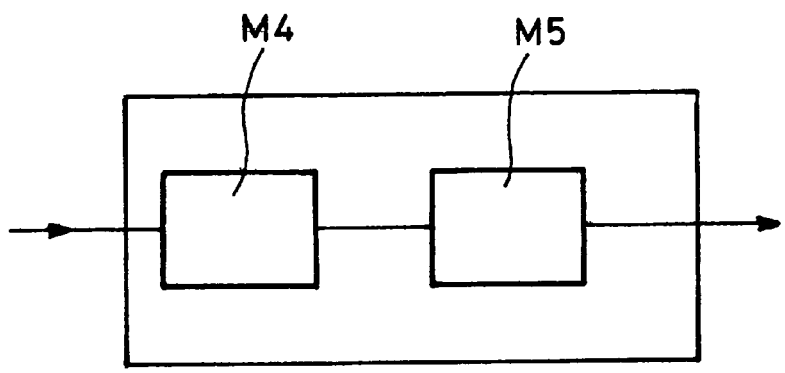
FIG_6
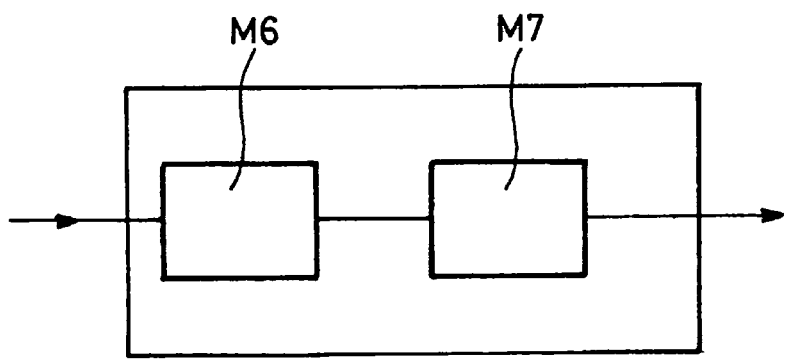
FIG_7

HANDLING OF USER ACCESS-DEPENDENT INFORMATION IN A CORE NETWORK SUBSYSTEM

This application is based on and claims the benefit of European Patent Application No. 05 290 906.6 filed Apr. 22, 2005, entitled "Handling of user access dependent information in a core network subsystem", which is incorporated by reference herein.

BACKGROUND OF THE INVENTION

The present invention is generally dealing with communication systems.

The present invention is in particular dealing with communication systems having a core network comprising a core network subsystem, such as in particular the IMS (Internet Protocol Multimedia Subsystem), accessed by an access network.

The example of IMS (as specified by 3GPP ($3^{rd}$ Generation Partnership Project)), will be considered more particularly in the following, as an example to which the present invention applies; however the present invention is not limited to such an example, and other examples are of course possible, such as for example MMD (Multi Media Domain, as specified by 3GPP2 ($3^{rd}$ Generation Partnership Project2)), IMS-NGN, . . . etc.

IMS is defined in particular in Technical Specification 3GPP TS 23.228 published by the 3GPP. As defined in this Technical Specification a system for the support of IP multimedia applications includes terminals, an IP-Connectivity Access Network (IP-CAN), and an IMS subsystem (IMS). An example of IP-CAN corresponds to the GPRS (General Packet Radio Service) Core Network with a Radio Access Network (or RAN) corresponding to GERAN (GSM EDGE Radio Access Network, where GSM stands for "Global System for Mobile communications" and EDGE stands for "Enhanced Data rates for GSM Evolution") and/or UTRAN (Universal Terrestrial Radio Access Network).

The example of GPRS will be considered more particularly in the following, as an example to which the present invention applies; however the present invention is not limited to this example, and other examples are of course possible, such as for example WLAN (Wireless Local Area Network), broadband access x-Digital Subscriber Line, . . . etc.

The general architecture of a system comprising a IMS subsystem, accessed by an access network IP-CAN, is recalled in FIG. 1, where there is illustrated:

a terminal, or UE (User Equipment), an access network IP-CAN including, among other elements not specifically illustrated, elements having a function of gateway with the IMS subsystem, such as in particular, in the example of GPRS, GGSN (Gateway GPRS Support Node), or, in the example of WLAN interworking, PDG (Packet Data Gateway), an IMS subsystem including, among other entities not specifically illustrated, entities such as in particular P-CSCF (Proxy-Call Session Control Function), I-CSCF (Interrogating-Call Session Control Function), S-CSCF (Serving-Call Session Control Function), HSS (Home Subscriber Server), AS (Application Server).

It is recalled that IMS uses a session control protocol based on the Session Initiation Protocol (SIP) as defined in particular in 3GPP TS 24.229. IMS entities such as P-CSCF, I-CSCF, S-CSCF correspond to SIP servers: P-CSCF corresponds to an entry point within the IMS, I-CSCF corresponds to an entry point within an operator's network, S-CSCF corresponds to an entity mainly in charge of session control and registration. HSS corresponds to a data base for subscriber and service-related data of the IMS, and ASs can be used to provide value-added services to a subscriber. Different IMS procedures, and the roles of the different IMS entities in these different IMS procedures, are defined in particular in 3GPP TS 23.228 and 3GPP TS 24.229.

It is also recalled that in the case of mobile access, the access network generally comprises different networks or PLMNs (Public Land Mobile Networks) between which the user may roam; further, the access network may support different Radio Access Technologies (RATs), and in the same way the terminals may be multi-RAT terminals, supporting different RATs. Examples of RATs include second generation technologies or 2G (based on TDMA, or Time Division Multiple Access), third generation technologies or 3G (based on W-CDMA, or Wideband-Code Division Multiple Access), UMA (Unlicensed Mobile Access), Wi-Fi . . . etc. In such a context, information enabling to indicate how an user accesses the IMS subsystem is generally necessary, for control of service delivery to an user, in the core network in general, and in the IMS subsystem in particular. In a general way, such information can be called user access-dependent information.

Such user access-dependent information may in particular include:

location information, enabling to describe the current location of the user within the network, generally with one or more parameters or identities such as (in the case of mobile access): the identity of a serving cell, the identity of a group of cells including a serving cell (such as LA (Location Area) or RA (Routing Area)), the identity of a serving network element, the identity of the serving PLMN where the user is actually camping (i.e. whether the user is roaming or located in his/her Home network), . . . etc., access technology information, enabling to describe the access technology currently used by the user, for example the Radio Access Technology (RAT) actually used by the user, such as for example GERAN, UTRAN, UMA, Wi-Fi, . . . etc.

Such user access-dependent information may in particular be very useful for the following tasks:

charging: e.g. lower charge when user is under Wi-Fi coverage, charging depending on the user being roaming or in nomadic situation . . . etc., service authorization: e.g. to check whether a roaming UE is allowed to use an IMS service or to use IMS at all, i.e. to check whether the user is allowed to benefit from IMS service in the network where he/she is currently camping on, management of emergency services, . . . etc.

SUMMARY OF THE INVENTION

As recognized by the present invention, the current state of the art for the handling of user access-dependent information in systems comprising a core network subsystem accessed by an access system is not optimum or raises a number of problems, as will now be explained, to simplify based on examples.

As disclosed in particular in 3GPP TS 24.229, when it sends a SIP method (or SIP message) to the network, the UE may populate a SIP header, called "P-Access-Network-Info header" with information about its current location and about the RAT (Radio Access Technology) currently used. Information about the current location of the UE as sent in the "P-Access-Network-Info header" corresponds to a cell identity. It is recalled that information about the current PLMN can be extracted from the cell identity; indeed, the cell identity is a concatenation of a Network Identifier (e.g. PLMN-Id), Location Area Identifier (e.g. Location Area Code (LAC)), and Cell Identifier (CI).

However, a problem is that such information as generated by the UE cannot be trusted by the network, in particular if it is to be used for such purpose as to charge an UE or for service authorization for an UE, for such reasons as security reasons, (information sent by a terminal cannot be trusted by the network for charging purposes), problems like a bug or failure in the terminal, . . . etc.

Further, another problem is that some terminals may not able to get their location from their access' networks (such as for example in case of fixed access or in some cases of Wi-Fi access to IMS) and therefore cannot provide the relevant access-dependent information (such as "P-Access-Network-Info header") in their core network signalling (e.g. SIP). Therefore, for such reasons, proper charging and service authorization cannot either be ensured in this case.

These issues are critical when the gateway node (such as for example GGSN) used to access to IMS (and thus the IMS entity such as P-CSCF having a function of entry point within the IMS) is in the Home network. In this case the actual PLMN of the UE cannot be deduced by the IMS subsystem from the network where the P-CSCF is located (as in this case other access nodes such as RAN and SGSN used to access IMS may be in the Home network or in a Visited network).

When IMS entities in charge of charging or of other service function (in particular entities such as CSCF, AS, HSS) need to know such information as the actual access network where the user is camping, and/or the RAT actually used by the UE, they may:
  issue a Location Request,
  get the information through the "Sh" interface of the HSS.

However, such solutions in particular have as drawback that they require an external interaction, inducing (for example, for the case of mobile access) the IMS layer to contact the Access layer, e.g. to contact GPRS Core Network elements via MAP (Mobile Application Part) protocol. For example:
  when issuing a Location Request, the CSCF or AS needs to contact a GMLC (Gateway Mobile Location Center), which itself first contacts the HLR (Home Location Register) to get the identity of the SGSN and then contacts the SGSN to get the location information,
  when getting the information through the "Sh" interface of the HSS, the CSCF or AS needs to contact the IMS part of the HSS, which itself gets the location information via the HLR and the SGSN.

As a result, such solutions in particular have the drawback that they are not optimised, in particular they consume too much processing resource and they are time consuming.

It is also recalled that, during a IMS registration procedure, an appropriate S-CSCF first has to be selected. For such a selection, the P-CSCF first forwards a Register request (received from the UE) to a I-CSCF, which in turn contacts the HSS, which in turns provides back information to select an appropriate S-CSCF, based in particular on the roaming rights of the user. The information currently communicated by the I-CSCF to the HSS for such a selection corresponds to the "P-Visited-Network-Id" header inserted by the P-CSCF in the Register request received from the UE, before forwarding this Register request to the I-CSCF.

However, another problem with this current solution is that the checking of roaming rights is based solely on the location of the P-CSCF (as the P-CSCF cannot put in the "P-Visited-Network-Id" header another identity than the one of the network where it is located). A problem is that this is not accurate as there are configurations where the P-CSCF is in the Home network whereas the user is actually physically roaming in another network.

The present invention in particular enables to solve part or all of the above-mentioned problems, or to avoid part or all of the above-mentioned drawbacks. More generally, the present invention enables to improve the performances in such systems.

These and other objects are achieved, in one aspect of the invention, by a method for the handling of user access-dependent information in a system comprising a core network subsystem accessed by an access network, said method comprising:
  a step wherein an entity of said core network subsystem obtains user access-dependent information from said access network.

According to another aspect, said method comprises:
  a step wherein an entity of said core network subsystem signals to another entity, in the context of a core network subsystem procedure relating to a user's terminal, user access-dependent information as obtained from said access network.

According to another aspect, said method comprises:
  a step wherein an entity of said core network subsystem uses user access-dependent information obtained from said access network, for control of service delivery to said user.

Another aspect of the present invention is an entity of a core network subsystem, for a system comprising a core network subsystem accessed by an access network, said entity comprising:
  means for obtaining user access-dependent information from said access network.

According to another object, said network entity comprises means for storing user access-dependent information obtained from said access network.

Another aspect of the present invention is an entity of a core network subsystem, for a system comprising a core network subsystem accessed by an access network, said entity comprising:
  means for signalling to another entity, in the context of a core network subsystem procedure relating to a user's terminal, user access-dependent information as obtained from said access network.

According to another object, said entity comprises:
  means for signalling said user access-dependent information obtained from said access network in addition to user access-dependent information signalled by a user's terminal.

According to another object, said entity comprises:
  means for signalling user access-dependent information obtained from said access network in replacement of user access-dependent information signalled by a user's terminal.

According to another object, said entity comprises:
  means for signalling said user access-dependent information obtained from said access network in addition to node location-dependent information signalled by said entity.

According to another object, said entity comprises:
  means for signalling user access-dependent information obtained from said access network in replacement of node location-dependent information signalled by said entity.

According to another object, said signalling corresponds to SIP (Session Initiation Protocol) signalling.

According to another object, said user access-dependent information signalled by a user's terminal corresponds to the content of a "P-Access-Network-Info" SIP header.

According to another object, said node location-dependent information signalled by said entity corresponds to the content of a "P-Visited-Network-Id" SIP header.

According to another object, said network entity comprises:
  means for signing said signalled user access-dependent information, by using a signature mechanism indicating that said information has been validated by a trusted entity.

According to another object, said network entity corresponds to an entity having a function of Proxy Call Session Control Function (P-CSCF).

Another aspect of the present invention is an entity of a core network subsystem, for a system comprising a core network subsystem accessed by an access network, said entity comprising:
  means for using user access-dependent information obtained from said access network, for control of service delivery to said user.

Another aspect of the present invention is a network entity of a core network subsystem, in a system comprising a core network subsystem accessed by an access network, said entity comprising:
  means for receiving user access-dependent information as obtained from said access network, said information being signalled to said entity by another entity of said core network subsystem, in the context of a core network subsystem procedure relating to a user's terminal.

According to another object, said network entity comprises:
  means for using said received user access-dependent information, for control of service delivery to a user.

According to another object, said network entity comprises:
  means for using said received user access-dependent information, for checking roaming rights for a user.

According to another object, said network entity comprises:
  means for signalling said received user access-dependent information to an authorization server.

According to another object, said network entity comprises:
  means for signalling said user access-dependent information in addition to node location-dependent information signalled by said entity.

According to another object, said network entity comprises:
  means for signalling said user access-dependent information in replacement of node location information signalled by said entity.

According to another object, said node location-dependent information signalled by said entity corresponds to the content of a "P-Visited-Network-Id" SIP header.

According to another object, said network entity corresponds to an entity having a function of Call Session Control Function (CSCF)/proxy sip or of Application Server (AS) or of AAA server such as HSS.

According to another object, said network entity corresponds to an entity having a function of Interrogating Call Session Control Function (I-CSCF).

BRIEF DESCRIPTION OF THE DRAWINGS

These and other objects of the present invention will become more apparent from the following description taken in conjunction with the accompanying drawings:

FIG. 1 is intended to recall the general architecture of a system comprising a IMS subsystem, accessed by an access network corresponding for example to the case of GPRS access network, FIGS. 2 to 4 are intended to illustrate different examples of application of the present invention to a system such as the one illustrated in FIG. 1, FIGS. 5 to 7 are intended to illustrate different examples of embodiments of IMS entities, according to different aspects of the present invention.

MORE DETAILED DESCRIPTION OF THE INVENTION

In a first one of its different aspects, the present invention suggests that an entity of a core network subsystem (such as in particular an IMS entity network (such as in particular from an element of the access network like GGSN or PDG having a function of gateway with the core network subsystem).

This first aspect of the invention will first be explained, for example as follows.

The example of GPRS will be considered more particularly in the following, as an example to which the present invention applies; however the present invention is not limited to this example, and other examples are of course possible, such as for example WLAN (Wireless Local Area Network), broadband access x-Digital Subscriber Line, . . . etc.

In a GPRS core network for example, a SGSN (Serving GPRS Support Node) provides user access-dependent information to a GGSN (Gateway GPRS Support Node), in messages sent according to the GTP-c protocol (Gateway Tunneling Protocol for control plane) as defined in particular in 3GPP TS 29.060.

User access-dependent information, as provided in messages sent according to the GTP-c protocol, includes:
  information on the current RAT used by the UE,
  information on the current location of the UE.

Information about the current location of the UE, as provided in messages sent according to the GTP-c protocol, corresponds to the RAI (Routing Area Identity) where the UE is registered. It is noted that information on the current PLMN can be extracted from the RAI; indeed, the PLMN-id is part of the RAI.

Such user access-dependent information is provided in messages sent according to the GTP-c protocol on the following occasions:
  at PDP (Packet Data Protocol) context activation, to give the RAT of the radio access network where the PDP context has been activated,
  at inter-RAT/intra-SGSN RA (Routing Area) update (e.g. at inter-system change),
  at inter-SGSN change (e.g. at inter-system change).

Further, in a GPRS or WLAN interworking core network, user access-dependent information is provided by the gateway between Access Network and IMS subsystem, to a server such as in particular a AAA server (Authentication, Authorization and Accounting server), in messages sent according to a protocol such as in particular the AAA protocol, as defined in particular in 3GPP TS 29.061. In the illustrated example, this gateway corresponds to a GGSN, but in other embodiments of the invention, this gateway could correspond to other entities such as a Packet Data Gateway defined in 3gpp 23.234 or a PDSN defined by 3gpp2 or other similar gateways.

User access-dependent information, as provided in messages sent according to the AAA protocol, includes:
information on the current RAT used by the UE,
information on the current location of the UE.

Information about the current location of the UE, as provided in messages sent according to the AAA protocol, corresponds to the RAI (Routing Area Identity) where the UE is registered. It is noted that information on the current PLMN can be extracted from the RAI; indeed, the PLMN-id is part of the RAI.

It is recalled that before using IMS services, a PDP context has to be activated. Such a process of PDP context activation (or PDP context modification) is illustrated in FIGS. 2 to 4 by a line between UE and GGSN.

User access-dependent information, as provided in messages sent according to the AAA protocol, is signaled by a GGSN to a AAA server in particular during such a process of PDP context activation (or PDP context modification). In FIGS. 2 to 4, said signalling of user access-dependent information between a GGSN and a AAA server is illustrated as a signalling between GGSN and HSS. In this example, such signalling is illustrated by an arrow, noted "notification of (VPLMN, RAT)" between GGSN and HSS. It has to be noted that the mechanism proposed in the present invention is independent from the actual target of the AAA signalling sent by the GGSN (which could be the HSS, the P-CSCF itself or other AAA servers).

In the examples illustrated in FIGS. 2 to 4, the present invention suggests that an IMS entity, such as in particular P-CSCF (having a function of entry point within the IMS), can be made aware of user access-dependent information. In this example, such user access-dependent information are sent by the gateway (e.g. GGSN in the illustrated example) between Access and Core networks, on its AAA interface. This is illustrated in a simplified way in FIGS. 2 to 4 by the arrow between GGSN and HSS, noted "notification of (VPLMN, RAT)", passing via the P-CSCF.

It is also suggested that an entity of the IMS subsystem (such as in particular, in this example, P-CSCF) stores user access-dependent information obtained from the access network, as illustrated in FIGS. 2 to 4 by the indication "Storage of VPLMN, RAT" in the block corresponding to the P-CSCF. In particular, P-CSCF can store the "RAT-Type" and the "SGSN-MCC (Mobile Country Code)-MNC (Mobile Network Code)" (i.e. information on whether/where the user is roaming) together with their relationship with identities of the UE, such as access identity, and IP address.

In a second one of its different aspects, the present invention suggests that an entity of said core network subsystem signals to another entity, in the context of a core network subsystem procedure relating to a user's terminal, user access-dependent information as obtained from said access network.

Different examples for such signaling are illustrated in FIGS. 2 to 4. More particularly, the examples of FIGS. 3 and 4 apply to the first signaling message sent by a UE during a registration procedure, when no C-CSCF has yet been assigned and an I-CSCF first has to be contacted, whereas FIG. 2 applies to the case where a S-SCFC has already been assigned.

In the examples illustrated in FIGS. 2 to 4, in the context of an IMS procedure initiated for example by a SIP signaling message sent by the UE to the P-CSCF (as illustrated by arrows noted "sip" between UE and SGSN, and between SGSN and P-CSCF), P-CSCF signals to another IMS entity (such as S-CSCF in FIG. 2, or I-CSCF in FIGS. 3 and 4) user access-dependent information as obtained from the access network.

There may be different ways by which an IMS entity signals to another IMS entity user access-dependent information obtained from the access network.

For example, in the examples illustrated in FIGS. 2 and 3, taking into account that the signaling message sent by the UE includes user access-dependent signaled by the UE, in the "P-Access-Network-lnfo" header:
in a first example, user access-dependent information as obtained from the access network may be signalled in replacement of user access-dependent information signalled by the UE (for example in the same "P-Access-Network-Info" header),
in a second example, user access-dependent information as obtained from the access network may be signalled in addition to user access-dependent information signalled by the UE (for example in the same "P-Access-Network-lnfo" header or in another header).

Of course, these are only examples, and as appreciated by the skilled person, other examples could be possible.

Further, in the example illustrated in FIGS. 2 and 3, P-CSCF can generate user access-dependent information such as a P-Access-Network-Info header if none has been received from the UE. For example, P-CSCF can generate a "minimum" P-Access-Network-Info header with access-type field and MCC-MNC provided by the P-CSCF if none has been received by the P-CSCF; in this case the Cell-Id or SAC (Service Area Code) could be set to a dummy value (such as for example FFFF).

Further, P-CSCF can certify, or sign, the user access-dependent information it has put in this message, by using a signature mechanism indicating that said information has been validated by a trusted entity. Said signature mechanism may for example correspond to Public Key Infrastructure (PKI), as disclosed for example in RFC 3647, RFC2587, RFC2585, RFC2560, published by the IETF (Internet Engineering Task Force).

These different examples are illustrated by the indication "Certify or fill-in P-Access-Network-Info" in the P-CSCF in FIG. 2, or "Certify or fill-in P-Access-Network-Info of SIP Register" in the P-CSCF in FIG. 3.

In the same way, in the example illustrated in FIG. 4, there may be different ways by which an IMS entity (like P-CSCF) signals to another IMS entity (like I-CSCF) user access-dependent information obtained from the access network, taking into account that the signaling message sent by an IMS entity like P-CSCF to an IMS entity like I-CSCF includes node location-dependent information signaled by this entity, in the "P-Visited-Network-Id" header:
in a first example, user access-dependent information as obtained from the access network may be signalled in replacement of node location-dependent information signalled by the P-CSCF (for example in the same "P-Visited-Network-Id" header).
in a second example, user access-dependent information as obtained from the access network may be signalled in addition to node location-dependent information signalled by the P-CSCF (for example in the same "P-Visited-Network-Id" header or in another header).

Of course, these are only examples, and as appreciated by the skilled person, other examples could be possible.

These different examples are illustrated in FIG. 4 by the indication "Put actual UE location in P-Visited-Network-Id of SIP REGISTER" in the P-CSCF.

In a third one of its different aspects, the present invention suggests that an entity of the core network subsystem uses user access-dependent information obtained from the access network and possibly certified by a network entity (such as a sip proxy), for control of service delivery to said user.

In the example of FIG. 2, based on valid (and possibly certified) user access-dependent information received from the P-CSCF, other IMS entities like S-CSCF and AS, may use this information, for example to take appropriate charging and service authorization decisions. This is illustrated in FIG. 2 by the indication "Use P-Access-Network-Info in e.g. charging related behavior" in the P-CSCF, and "Provide AS with P-Access-Network-Info" in the AS.

In a similar way, in the example of FIG. 3, based on valid (and possibly certified) user access-dependent information received from the P-CSCF, other IMS entities like I-CSCF, may use this information, for example to make an appropriate checking of roaming rights. This is illustrated in FIG. 3 by the indication "Provide HSS with information on P-CSCF location (P-Visited-Network-Info) and with network cetified P-Access-Network-Info" on the arrow between I-CSCF and HSS, and the indication "Check of roaming rights based on P-CSCF location and on network certified P-Access-Network-Info" in the HSS.

In the example of FIG. 3, there may also be different ways for an IMS entity like I-CSCF to signal to an authorization server like HSS, valid user acces-dependent information (got, as previously described, from an IMS entity like P-CSCF), taking into account that the signaling message sent by an IMS entity like I-CSCF to an authorization server like HSS includes user access-dependent information signaled by this IMS entity like I-CSCF, in the "P-Visited-Network-Id" header:

in an example, said information may be signalled in replacement of node location-dependent information signalled by said entity (for example in the same "P-Visited-Network-Id" header).

in another example, said information may be signalled in addition to node location-dependent information signalled by said entity (for example in the same "P-Visited-Network-Id" header or in another header).

Of course, these are only examples, and as appreciated by the skilled person, other examples could be possible.

In the example of FIG. 4, based on actual user access-dependent information received from the P-CSCF, other IMS entities like I-CSCF, may use this information, for example to make an appropriate checking of roaming rights. This is illustrated in FIG. 4 by the indication "Provide HSS with actual information on user location" on the arrow between I-CSCF and HSS, and the indication "Check of roaming rights based on actual location of the UE" in the HSS.

From the different examples considered above, it can be understood that the present invention thus enables an improved handling of user access-dependent information in a core network subsystem, avoiding in particular the above-mentioned drawbacks.

Furthermore, having P-CSCF knowing the actual roaming access network i.e. the network where the user is physically located in, may also prove to be useful in the future to properly handle emergency sessions i.e. will allow to detect that a number is an emergency number in the location where the user is actually camping and thus allow to redirect the IMS session to the proper emergency center.

In FIG. 5, there is illustrated an example of means which may be provided in an IMS entity, such as in particular P-CSCF (having a function of entry point within the IMS), for carrying out the present invention.

An entity of a IMS subsystem (such as in particular P-CSCF) may comprise means noted M1 for obtaining user-access dependent information noted "inf" from the access network.

An entity of a IMS subsystem (such as in particular P-CSCF) may also comprise means noted M2 for storing user access-dependent information obtained from said access network, in particular together with its relationship with user's identity and/or address information.

There may be different ways by which P-CSCF may obtain user access-dependent information from the access network, such as from signalling between GGSN and a server such as a AAA server (as explained above).

In one example, P-CSCF can act as a proxy server, meaning that GGSN directs said signaling to P-CSCF and that P-CSCF proxies (forwards) further towards the final destination. This could be the case of a co-located P-CSCF and GGSN.

In other words, according to this example, in an entity of a IMS subsystem (such as in particular P-CSCF) such as the one illustrated in FIG. 5, means M1 may comprise means for acting as a proxy server between a server and an entity of said access network in charge of signalling said user access-dependent information to said server, in the context of an access network procedure relating to a user's terminal.

In another example, a proxy server forwards a copy of said signaling to P-CSCF, further to forwarding said signalling to the server needing this signalling.

In other words, according to this other example, in an entity of a IMS subsystem (such as in particular P-CSCF) such as the one illustrated in FIG. 5, means M1 may comprise means for receiving a copy of said user access dependent information, from a proxy server provided between a server and an entity of said access network in charge of signalling said user access-dependent information to said server, in the context of an access network procedure relating to a user's terminal.

In another example, a proxy server stores the information in a database that P-CSCF can look-up.

In other words, according to this other example, in an entity of a IMS subsystem (such as in particular P-CSCF) such as the one illustrated in FIG. 5, means M1 may comprise means for obtaining said information from a database associated to a proxy server provided between a server and an entity of said access network in charge of signalling said user access-dependent information to said server, in the context of an access network procedure relating to a user's terminal.

According to another example, in an entity of a IMS subsystem (such as in particular P-CSCF) such as the one illustrated in FIG. 5, means M1 may comprise means for acting as a final server to which an entity of said access network in charge of signalling said user access dependent information, in the context of an access network procedure relating to a user's terminal, signals said user access dependent information.

Other examples may of course be possible, as understood by a person skilled in the art.

An entity of a IMS subsystem (such as in particular P-CSCF) may also comprise means noted M3 for signalling to another IMS entity, in the context of a IMS procedure relating to a UE, user access-dependent information as obtained from said access network.

Different examples of such signaling (i.e. different examples of taking into account the information "inf" in the generation of an outgoing message noted "m2" from an incoming message noted "m1") have been disclosed in relation with FIGS. 2 to 4.

In FIG. 6, there is illustrated an example of means to be provided in an IMS entity, such as in particular S-CSCF or AS, for carrying out the present invention.

An entity of a IMS subsystem (such as for example S-CSCF or AS) may comprise means noted M4 for receiving user access-dependent information based on user access-dependent information as obtained from said access network, said information being signalled to said entity by another entity of said core network subsystem, in the context of a core network subsystem procedure relating to a user's terminal.

An entity of a IMS subsystem (such as for example S-CSCF or AS) may also comprise means noted M5 for using said user access-dependent information, for management or control of service delivery to a user.

In FIG. 7, there is illustrated an example of means to be provided in an IMS entity, such as in particular I-CSCF or HSS, for carrying out the present invention.

An entity of a IMS subsystem (such as for example I-CSCF) may comprise means noted M6 for receiving user access-dependent information as obtained from said access network, said information being signalled to said entity by another entity of said core network subsystem, in the context of a core network subsystem procedure relating to a user's terminal.

An entity of a IMS subsystem (such as for example I-CSCF) may also comprise means noted M7 for using said user access-dependent information, for checking of roaming rights for a user during a registration procedure.

Said means for checking of roaming rights may in turn comprise means for signalling user access-dependent information by said IMS entity like I-CSCF, to an authorization server (or AAA server).

According to the different examples described in relation with FIG. 3:

in an example, said means may in turn comprise means for signalling said information in replacement of node location-dependent information signalled by said entity.

in another example, said means may in turn comprise means for signalling said information in addition to node location-dependent information signalled by said entity.

Other examples may of course be possible, as understood by a person skilled in the art.

Besides, the above-mentioned means (M1 to M7) do not require to be more fully disclosed than by their above disclosed function, for a person skilled in the art.

Besides, as understood by the person skilled in the art, IMS entities illustrated as separate in the above disclosed examples may in fact be located in a same equipement, depending on the implementation.

We claim:

1. A Proxy Call Session Control Function (P-CSCF), for use in a system having a core network subsystem accessed by an IP-connectivity access network, said P-CSCF comprising:

a first sub-entity configured to obtain user access-dependent information from said IP-connectivity access network from AAA signaling sent by an element of said IP-connectivity access network to a server, the AAA signaling being sent to the server in the context of an access network procedure relating to a user terminal, and the element of said IP-connectivity access network functioning as a gateway with the core network subsystem; wherein the user access-dependent information includes at least one of (i) a current location of the user terminal within the system and (ii) a radio access technology currently being used by the user terminal to access the system.

2. The P-CSCF according to claim 1, comprising:

a storage device for storing the user access-dependent information obtained from said AAA signaling.

3. The P-CSCF according to claim 1, wherein the first sub-entity is further configured to signal to another entity, in the context of a core network subsystem procedure relating to the user terminal, user access-dependent information as obtained from said AAA signaling.

4. The P-CSCF according to claim 3, comprising:

a second sub-entity configured to signal said user access-dependent information obtained from said AAA signaling in addition to user access-dependent information signaled by the user terminal.

5. The P-CSCF according to claim 3, comprising:

a second sub-entity configured to signal user access-dependent information obtained from said AAA signaling in replacement of user access-dependent information signaled by the user terminal.

6. The P-CSCF according to claim 3, comprising:

a second sub-entity configured to signal said user access-dependent information obtained from said AAA signaling in addition to node location-dependent information.

7. The P-CSCF according to claim 3, comprising:

a second sub-entity configured to signal user access-dependent information obtained from said AAA signaling in replacement of node location-dependent information.

8. The P-CSCF according to claim 3, wherein said signaling between the first sub-entity and the another entity corresponds to SIP (Session Initiation Protocol) signaling.

9. The P-CSCF according to claim 4, wherein said user access-dependent information signaled by the user terminal corresponds to the content of a "P-Access-Network-Info" SIP header.

10. The P-CSCF according to claim 6, wherein said node location-dependent information corresponds to the content of a "P-Visited-Network-Id" SIP header.

11. The P-CSCF according to claim 3, comprising:

a second sub-entity configured for signing said signaled user access-dependent information, by using a signature mechanism indicating that said information has been validated by a trusted entity.

12. The P-CSCF according to claim 5, wherein said user access-dependent information signaled by the user terminal corresponds to the content of a "P-Access-Network-Info" SIP header.

13. The P-CSCF according to claim 7, wherein said node location-dependent information corresponds to the content of a "P-Visited-Network-Id" SIP header.

14. One of an Interrogating Call Session Control Function (I-CSCF) and a Serving Call Session Control Function (S-CSCF), for use in a system having a core network subsystem accessed by an IP-connectivity access network, comprising:

a first sub-entity configured to receive user access-dependent information as obtained from said IP-connectivity access network, said information being signaled to said one of I-CSCF and S-CSCF by a Proxy Call Session Control Function (P-CSCF) of said core network subsystem, in the context of a core network subsystem procedure relating to a user terminal, the user access-dependent information being obtained by the P-CSCF from AAA signaling sent from an element of said IP-connectivity access network to a server, the AAA signaling being sent to the server in the context of the access network procedure relating to the user terminal, and said element of said IP-connectivity access network functioning as a gateway with the core network subsystem; wherein the user-access dependent information includes at least one of (i) a current location of the user terminal within the system and (ii) a radio access technology currently being used by the user terminal to access the system.

15. The one of I-CSCF and S-CSCF according to claim 14, wherein the one of I-CSCF and S-CSCF is configured to use said received user access-dependent information, for control of service delivery to a user.

16. The one of I-CSCF and S-CSCF according to claim 15, comprising:
a third sub-entity configured to use said received user access-dependent information, for checking roaming rights for a user.

17. The one of I-CSCF and S-CSCF according to claim 16, comprising:
a fourth sub-entity configured to signal said received user access-dependent information to an authorization server.

18. The one of I-CSCF and S-CSCF according to claim 17, comprising:
a fifth sub-entity configured to signal said user access-dependent information in addition to node location-dependent information signaled by said fourth sub-entity.

19. The one of I-CSCF and S-CSCF according to claim 17, comprising:
a fifth sub-entity configured to signal said user access-dependent information in replacement of node location information signaled by said fourth sub-entity.

20. The one of I-CSCF and S-CSCF according to claim 15, wherein said node location-dependent information signaled by said fourth sub-entity corresponds to the content of a "P-Visited-Network-Id" SIP header.

21. The one of I-CSCF and S-CSCF according to claim 14, wherein the first sub-entity is further configured to provide an Application Server (AS) with said received user access-dependent information, in P-Access-Network-Info.

* * * * *